UNITED STATES PATENT OFFICE 2,191,266

SOFTENING RUBBER

Ira Williams, Woodstown, and Carroll Cummings Smith, Carneys Point, N. J., assignors to E. I. du Pont de Nemours & Company, Wilmington, Del., a corporation of Delaware No Drawing. Application October 8, 1937, Serial No. 167,982

25 Claims. (Cl. 260—761)

This invention relates to rubber and more particularly to methods of treating rubber to produce a more plastic product.

It is well known that rubber is rendered more plastic when it is subjected to mechanical working in the presence of oxygen. The degree of plastication is determined to a great extent by the temperature and the time of milling. This action can be greatly facilitated by the use of small amounts of certain assistants such as the mono-aryl-hydrazines and the thio-phenols. Such assistants, however, require time and/or high temperatures to produce their action. It is frequently desirable to plasticize the rubber more rapidly and particularly during mechanical working.

It is an object of this invention to provide an improved method for plasticizing rubber. Another object is to provide a new class of compounds for plasticizing rubber. A further object is to provide a method for more rapidly plasticizing rubber and new materials which will produce such more rapid plasticizing. Still further objects are to provide new compositions of matter and to advance the art. Still other objects will appear hereinafter.

These objects may be accomplished in accordance with the present invention by subjecting rubber, during the mixing period, to the action of a small amount of a thio-carboxylic acid or its sulfide. The acids and their sulfides may be represented by the formula

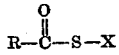

in which R is an organic radicle which may be aromatic, aliphatic or heterocyclic, and may be substituted by such groups as hydroxyl, alkoxy, carboxyl, nitro, halogen and mercapto groups, and X represents hydrogen or the group

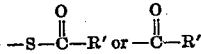

in which R' represents an organic radicle which may be the same or different than R. R and R' are each connected to the carboxyl carbon directly by means of a carbon to carbon linkage.

While the large class of thio-carboxylic acids and their sulfides appear to be effective for our purpose, it will generally be preferred to employ the aromatic thio-carboxylic acids and their sulfides, and particularly those in which R and R' are aromatic hydrocarbons. By the term "an aromatic thio-carboxylic acid or its sulfide," we means those in which the carboxyl carbon is directly bonded to a carbon of the aromatic ring. Of these aromatic compounds, those of the benzene series will generally be preferred.

The best results are obtained by the addition of the plasticizing agent directly to the rubber as early as possible in the mixing operation and in the absence of compounding ingredients. Sulfur has been found to materially retard the action of the thio acids and any material amount of sulfur in excess of 3% almost completely prevents the action of small amounts of the thio acids. The effect of sulfur may be overcome to a certain extent by the use of relatively large amounts of plasticizing agent. However, this is unnecessarily expensive and not satisfactory.

The salts of the thio acids appear to be substantially ineffective. However, the salts of the thio acids may be employed in certain cases where the rubber contains sufficient acidic material, either naturaly present or added, to release the thio acid so that it may exert its action. Accordingly, when we refer to the use of a thio acid hereinafter and in the claims, we intend to include the salts when added in the presence of sufficient acidic material under conditions which will cause the acidic material to react with the salt to release the free thio acid or when other conditions are employed which will cause the liberation of the free acid from the salt.

Basic ingredients, such as zinc oxide and lime, exert a very marked retarding action and should be avoided. The basic materials which will seriously retard the action of our compounds are those which are sufficiently active under the conditions employed to react with the thio acids or sulfides to form salts of the thio acids. When a thio acid is employed, sufficient basic material to completely neutralize the acid and form a salt therewith will substantially completely prevent the action of the acid.

Further, some accelerators and antioxidants exert a retarding action on our compounds to various degrees and any substantial amounts of them in excess of 3% should be avoided during the plasticizing period. In the case of the basic accelerators and antioxidants which are sufficiently active to react with the thio acids or sulfides, the rule as to basic materials will apply. Sulfur containing accelerators appear to act in a manner similar to free sulfur.

By the term "sulfides," we intend to include the polysulfides, which readily lose the excess sulfur without imparting sufficient free sulfur to the rubber system to prevent the plasticizing action.

Generally, our compounds will be employed in proportions of about 0.05 to about 2%, based on the rubber. Larger or smaller amounts may be employed if desired, but without advantage. Preferably, we employ from about .2% to about 1% of the plasticizing agent, based on the rubber.

Our compounds will be effective at room temperature. However, they will be more effective at temperatures above about 50° C. Preferably, temperatures of from about 100° C. to about 130° C. will be employed. In most cases, temperatures above 130° C. will not be required, although any temperature may be employed at which it is safe to heat rubber alone.

In order to more clearly illustrate our invention, the preferred modes of carrying the same into effect and the advantageous results to be obtained thereby, the following examples are given. In these examples, the mixing was conducted in a steam jacketed enclosed mixer. The plasticity of the rubber was determined with pendulum actuated parallel plate plastometer described in Industrial and Engineering Chemistry, analytical edition, 8 305 (1936). The plasticity number is proportional to the work required to deform the rubber, while the recovery is the thickness in millimeters recovered by the rubber after compression. The recovery figure appears to be of the most significance as indicating the degree of softness of the rubber.

EXAMPLE 1

Fifty parts of smoked sheet rubber was milled for a total time of 10 minutes at 120° C., in each case. The rubber was placed in the mixer and followed in one minute by the plasticizing agent. The rubber was removed from the mixer after 10 minutes and 90 minutes thereafter the plasticity measurements were made at 70° C. The following table shows the effectiveness of several different materials when tested under these conditions.

Table I

| Material added | Percent | Plasticity number | Recovery |
|---|---|---|---|
| None | | 47 | .545 |
| Thio-benzoic acid | 0.2 | 27 | .045 |
| Do | 0.4 | 22 | .005 |
| Thio-anisic acid | 0.5 | 23 | .007 |
| Benzoyl sulfide | 0.5 | 23 | .005 |
| Butyryl sulfide | 0.5 | 35 | .340 |
| Furoyl sulfide | 0.2 | 34 | .280 |
| Thio-stearic acid | 0.5 | 26 | .012 |
| Thio-furoic acid | 1.0 | 25 | .013 |
| 2-hydroxy-3-thio-naphthoic acid | 1.0 | 30 | .190 |
| Anthraquinone-2-thio-carboxylic acid | 1.0 | 42 | .450 |

EXAMPLE 2

This example illustrates the retarding action of sulfur and zinc oxide. The procedure of Example 1 was followed, but the zinc oxide and sulfur, when employed, were added one-half minute before the plasticizing agent. In the following Table II "P" denotes plasticity number, and "R" denotes recovery.

Table II

| Agent added | Other material added | | | | | | | |
|---|---|---|---|---|---|---|---|---|
| | None | | 3% sulfur | | 5% sulfur | | 10% ZnO | |
| | P | R | P | R | P | R | P | R |
| None | 47 | .570 | 46 | .560 | 45 | .560 | 48 | .580 |
| 0.3% benzoyl disulfide | 29 | .085 | 38 | .500 | 41 | .530 | 43 | .480 |
| 0.2% zinc thio-benzoate | 27 | .040 | 40 | .500 | 40 | .500 | 47 | .555 |

It will be noted that in this example, the zinc thio-benzoate was effective in the absence of added sulfur or zinc oxide. However, the rubber contained sufficient acidic compounds naturally present therein to release the free thio-benzoic acid under the conditions employed.

The compounds of our invention are generally well known, as are also the methods for preparing them. They can be readily prepared by treating the acid chloride with a sodium sulfide such as sodium sulfhydrate, sodium sulfide or other sodium sulfur compound. The methods of preparing the compounds are more clearly described in more detail in the literature.

Other thio-carboxylic acids which may be employed for our purpose in accordance with our invention are:

thio-acetic acid
thio-propionic acid
thio-butyric acid
thio-isobutyric acid
thio-valeric acid
thio-isovaleric acid
thio-hexoic acid
thio-caprylic acid
thio-lauric acid
thio-myristic acid
thio-palmitic acid
thio-hydroxystearic acid
thio-acrylic acid
thio-crotonic acid
thio-oleic acid
thio-linoleic acid
thio-ricinoleic acid
thio-phenyl acetic acid
thio-cinnamic acid
thio-hydrocinnamic acid
thio-phenyl acrylic acid
thio-naphthenic acids
thio-toluic acids
thio-xyloic acids
mesitylene thio-carboxylic acids
thio-ethylbenzoic acids
mono-thio-phthalic acids
hydroxy-methyl-thio-benzoic acids
thio-chlorbenzoic acids
thio-hexahydrobenzoic acids
thio-a-naphthoic acids
thio-beta-naphthoic acids
thio-anthranoic acids
thio-phenylbenzoic acids Other sulfides which may be employed are:
toluyl sulfide
toluyl disulfide
xyloyl sulfide
xyloyl disulfide
mesityloyl sulfide
mesityloyl disulfide
ethylbenzoyl sulfide
ethylbenzoyl disulfide
o-carboxyl-benzoyl sulfide
o-carboxyl-benzoyl disulfide
hydroxy-methyl benzoyl sulfide
hydroxy-methyl benzoyl disulfide
chlorbenzoyl sulfide
chlorbenzoyl disulfide
hexahydrobenzoyl sulfide
hexahydrobenzoyl disulfide
a-naphthoyl sulfide
a-naphthoyl disulfide
b-naphthoyl sulfide
b-naphthoyl disulfide
anisoyl sulfide
anisoyl disulfide
anthranoyl sulfide
anthranoyl disulfide
phenylbenzoyl sulfide
phenyl benzoyl disulfide
acetyl sulfide
acetyl disulfide
propionyl sulfide
isobutyryl sulfide isobutyryl disulfide
valeryl sulfide
caproyl sulfide
caproyl disulfide
lauroyl sulfide
lauroyl disulfide
stearoyl sulfide
stearoyl disulfide
hydroxystearoyl sulfide
hydroxystearoyl disulfide
acrylyl sulfide
acrylyl disulfide
oleyoyl sulfide
oleyoyl disulfide
linoleoyl sulfide
linoleoyl disulfide
phenylacetyl sulfide
phenylacetyl disulfide
cinnamyl sulfide
cinnamyl disulfide
hydrocinnamyl sulfide
hydrocinnamyl disulfide
phenylacrylyl sulfide
phenylacrylyl disulfide
naphthenoyl sulfide
naphthenoyl disulfide
2-hydroxy-3-naphthoyl sulfide
2-hydroxy-3-naphthoyl disulfide
sulfide of anthraquinone-2-thio-carboxylic acid
disulfide of anthraquinone-2-thio-carboxylic acid The various homologues and isomers of the compounds mentioned will also be effective. The radicle "R" in the formula

may be varied within wide limits, since the activity of the thio acid group is so great that the introduction of such substituents as nitro or sulfonic groups can usually be tolerated.

The application of our compounds to rubber may be varied in many ways. The rubber may be dissolved in a solvent and the solution treated with a plasticizing agent of our invention, especially at an elevated temperature, to produce rubber cements of low viscosity. Also, the plasticizing agent may be added to the rubber before solution in the solvent. The preparation of cements of low viscosity may be most advantageously effected by dissolving rubber in a solvent containing the plasticizing agent. The plasticizing agents may also be incorporated in the rubber by addition to latex before coagulation.

While we have disclosed the incorporation of our plasticizing agents with rubber in a heated internal mixer, other types of apparatus may be employed, such as an ordinary rubber mill, Banbury type of mixer or a Gordon type plasticator. These apparatus will also operate more efficiently at the elevated temperatures.

While we have disclosed the preferred embodiments of our invention and the preferred modes of carrying the same into effect, it will be readily apparent to those skilled in the art that many changes and variations may be made therein without departing from the spirit of our invention. Accordingly, the scope of our invention is to be limited solely by the appended claims construed as broadly as is permissible in view of the prior art.

We claim:

1. The method of decreasing the resistance to flow of unvulcanized rubber which comprises subjecting the unvulcanized rubber to the action of a monothio-carboxylic acid in which the sulfur is in the carboxyl group, in the absence of more than about 3% of sulfur and in the absence of sufficient basic material to neutralize the action of the compound, for a sufficient length of time for said thio-carboxylic acid compound to effect a marked decrease in the resistance of the rubber to flow over that which the rubber would have if subjected to the same conditions in the absence of said thio-carboxylic acid compound.

2. The method of decreasing the resistance to flow of unvulcanized rubber which comprises subjecting the unvulcanized rubber to the action of an aromatic monothio-carboxylic acid in which the sulfur is in the carboxyl group, in the absence of more than about 3% of sulfur and in the absence of sufficient basic material to neutralize the action of the compound, for a sufficient length of time for said thio-carboxylic acid compound to effect a marked decrease in the resistance of the rubber to flow over that which the rubber would have if subjected to the same conditions in the absence of said thio-carboxylic acid compound.

3. The method of decreasing the resistance to flow of unvulcanized rubber which comprises subjecting the unvulcanized rubber to the action of a compound having the formula

in which R represents a hydrocarbon radicle, in the absence of more than about 3% of sulfur and in the absence of sufficient basic material to neutralize the action of the compound, for a sufficient length of time for said compound to effect a marked decrease in the resistance of the rubber to flow over that which the rubber would have if subjected to the same conditions in the absence of said compound.

4. The method of decreasing the resistance to flow of unvulcanized rubber which comprises subjecting the unvulcanized rubber to the action of a compound having the formula

in which R represents an aromatic hydrocarbon radicle, in the absence of more than about 3% of sulfur and in the absence of sufficient basic material to neutralize the action of the compound, for a sufficient length of time for said compound to effect a marked decrease in the resistance of the rubber to flow over that which the rubber would have if subjected to the same conditions in the absence of said compound.

5. The method of decreasing the resistance to flow of unvulcanized rubber which comprises subjecting the unvulcanized rubber to the action of an aromatic monothio-carboxylic acid containing a single benzene ring and in which the sulfur of the acid is in the carboxyl group, in the absence of more than about 3% of sulfur and in the absence of sufficient basic material to neutralize the action of the compound, for a sufficient length of time for said thio-carboxylic acid compound to effect a marked decrease in the resistance of the rubber to flow over that which the rubber would have if subjected to the same conditions in the absence of said thio-carboxylic acid compound.

6. The method of decreasing the resistance to flow of unvulcanized rubber which comprises subjecting the unvulcanized rubber to the action of a compound having the formula $$R-\overset{O}{\underset{\|}{C}}-S-H$$

in which R represents a hydrocarbon radicle of the benzene series, in the absence of more than about 3% of sulfur and in the absence of sufficient basic material to neutralize the action of the compound, for a sufficient length of time for said compound to effect a marked decrease in the resistance of the rubber to flow over that which the rubber would have if subjected to the same conditions in the absence of said compound.

7. Rubber obtained by subjecting unvulcanized rubber to the action of a monothio-carboxylic acid in which the sulfur is in the carboxyl group, in the absence of more than about 3% of sulfur and in the absence of sufficient basic material to neutralize the action of the compound, for a sufficient length of time for said thio-carboxylic acid compound to effect a marked decrease in the resistance of the rubber to flow over that which the rubber would have if subjected to the same conditions in the absence of said thio-carboxylic acid compound.

8. Rubber obtained by subjecting unvulcanized rubber to the action of an aromatic monothio-carboxylic acid in which the sulfur is in the carboxyl group, in the absence of more than about 3% of sulfur and in the absence of sufficient basic material to neutralize the action of the compound, for a sufficient length of time for said thio-carboxylic acid compound to effect a marked decrease in the resistance of the rubber to flow over that which the rubber would have if subjected to the same conditions in the absence of said thio-carboxylic acid compound.

9. The method of decreasing the resistance to flow of unvulcanized rubber which comprises subjecting the unvulcanized rubber to the action of a thio-carboxylic acid compound having the formula $$R-\overset{O}{\underset{\|}{C}}-S-X$$

wherein R represents an organic radicle and X represents a member of the group consisting of hydrogen and groups of the formulae $$-S-\overset{O}{\underset{\|}{C}}-R' \text{ and } -\overset{O}{\underset{\|}{C}}-R'$$

wherein R' represents an organic group, both R and R' being connected to the carboxyl carbons directly by carbon to carbon linkage, in the absence of more than about 3% of sulfur and in the absence of sufficient basic material to neutralize the action of the compound, for a sufficient length of time for said thio-carboxylic acid compound to effect a marked decrease in the resistance of the rubber to flow over that which the rubber would have if subjected to the same conditions in the absence of said thio-carboxylic acid compound.

10. The method of decreasing the resistance to flow of unvulcanized rubber which comprises subjecting the unvulcanized rubber to the action of a thio-carboxylic acid compound having the formula $$R-\overset{O}{\underset{\|}{C}}-S-X$$

wherein R represents an organic radicle and X represents a member of the group consisting of hydrogen and groups of the formulae $$-S-\overset{O}{\underset{\|}{C}}-R' \text{ and } -\overset{O}{\underset{\|}{C}}-R'$$

wherein R' represents an organic group, both R and R' being connected to the carboxyl carbons directly by carbon to carbon linkage, in the absence of compounding ingredients, for a sufficient length of time for said thio-carboxylic acid compound to effect a marked decrease in the resistance of the rubber to flow over that which the rubber would have if subjected to the same conditions in the absence of said thio-carboxylic acid compound.

11. The method of decreasing the resistance to flow of unvulcanized rubber which comprises subjecting the unvulcanized rubber to the action of a thio-carboxylic acid compound having the formula $$R-\overset{O}{\underset{\|}{C}}-S_n-\overset{O}{\underset{\|}{C}}-R'$$

wherein n represents an integer of 1 to 2 and R and R' represent organic radicles connected to the carboxyl carbons by carbon to carbon linkages, in the absence of more than about 3% of sulfur and in the absence of sufficient basic material to neutralize the action of the compound, for a sufficient length of time for said thio-carboxylic acid compound to effect a marked decrease in the resistance of the rubber to flow over that which the rubber would have if subjected to the same conditions in the absence of said thio-carboxylic acid compound.

12. The method of decreasing the resistance to flow of unvulcanized rubber which comprises subjecting the unvulcanized rubber to the action of a thio-carboxylic acid compound having the formula $$R-\overset{O}{\underset{\|}{C}}-S_n-\overset{O}{\underset{\|}{C}}-R'$$

wherein n represents an integer of 1 to 2 and R and R' represent aromatic radicles connected to the carboxyl carbons by carbon to carbon linkages, in the absence of more than about 3% of sulfur and in the absence of sufficient basic material to neutralize the action of the compound, for a sufficient length of time for said thio-carboxylic acid compound to effect a marked decrease in the resistance of the rubber to flow over that which the rubber would have if subjected to the same conditions in the absence of said thio-carboxylic acid compound.

13. The method of decreasing the resistance to flow of unvulcanized rubber which comprises subjecting the unvulcanized rubber to the action of a thio-carboxylic acid compound having the formula $$R-\overset{O}{\underset{\|}{C}}-S-\overset{O}{\underset{\|}{C}}-R'$$

wherein R and R' represent hydrocarbon radicles, in the absence of more than about 3% of sulfur and in the absence of sufficient basic material to neutralize the action of the compound, for a sufficient length of time for said thio-carboxylic acid compound to effect a marked decrease in the resistance of the rubber to flow over that which the rubber would have if subjected to the same conditions in the absence of said thio-carboxylic acid compound.

14. The method of decreasing the resistance to flow of unvulcanized rubber which comprises subjecting the unvulcanized rubber to the action of a thio-carboxylic acid compound having the formula

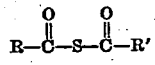

wherein R and R' each represent a single benzene ring, in the absence of more than about 3% of sulfur and in the absence of sufficient basic material to neutralize the action of the compound, for a sufficient length of time for said thio-carboxylic acid compound to effect a marked decrease in the resistance of the rubber to flow over that which the rubber would have if subjected to the same conditions in the absence of said thio-carboxylic acid compound.

15. The method of decreasing the resistance to flow of unvulcanized rubber which comprises subjecting the unvulcanized rubber to the action of a thio-carboxylic acid compound having the formula

wherein R and R' each represent a hydrocarbon radicle of the benzene series, in the absence of more than about 3% of sulfur and in the absence of sufficient basic material to neutralize the action of the compound, for a sufficient length of time for said thio-carboxylic acid compound to effect a marked decrease in the resistance of the rubber to flow over that which the rubber would have if subjected to the same conditions in the absence of said thio-carboxylic acid compound.

16. The method of decreasing the resistance to flow of unvulcanized rubber which comprises subjecting the unvulcanized rubber to the action of thio-benzoic acid, in the absence of more than about 3% of sulfur and in the absence of sufficient basic material to neutralize the action of the thio-benzoic acid, for a sufficient length of time for said thio-benzoic acid to effect a marked decrease in the resistance of the rubber to flow over that which the rubber would have if subjected to the same conditions in the absence of said thio-benzoic acid.

17. Rubber obtained by subjecting unvulcanized rubber to the action of a thio-carboxylic acid compound having the formula

wherein R represents an organic radicle and X represents a member of the group consisting of hydrogen and groups of the formulae

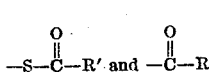

wherein R' represents an organic group, both R and R' being connected to the carboxylic carbons directly by a carbon to carbon linkage, in the absence of more than about 3% of sulfur and in the absence of sufficient basic material to neutralize the action of the thio-carboxylic acid compound, for a sufficient length of time for said thio-carboxylic compound to effect a marked decrease in the resistance of the rubber to flow over that which the rubber would have if subjected to the same conditions in the absence of said thio-carboxylic acid compound.

18. Rubber obtained by subjecting unvulcanized rubber to the action of a thio-carboxylic acid compound having the formula

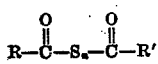

wherein $n$ represents an integer of 1 to 2 and R and R' represent aromatic radicles connected to the carboxyl carbons by carbon to carbon linkages, in the absence of more than about 3% of sulfur and in the absence of sufficient basic material to neutralize the action of the thio-carboxylic acid compound, for a sufficient length of time for said thio-carboxylic compound to effect a marked decrease in the resistance of the rubber to flow over that which the rubber would have if subjected to the same conditions in the absence of said thio-carboxylic acid compound.

19. Rubber obtained by subjecting unvulcanized rubber to the action of a thio-carboxylic acid compound having the formula

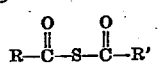

wherein R and R' represent hydrocarbon radicles, in the absence of more than about 3% of sulfur and in the absence of sufficient basic material to neutralize the action of the thio-carboxylic acid compound, for a sufficient length of time for said thio-carboxylic compound to effect a marked decrease in the resistance of the rubber to flow over that which the rubber would have if subjected to the same conditions in the absence of said thio-carboxylic acid compound.

20. Rubber obtained by subjecting unvulcanized rubber to the action of a thio-carboxylic acid compound having the formula

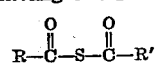

wherein R and R' each represents a hydrocarbon radicle of the benzene series, in the absence of more than about 3% of sulfur and in the absence of sufficient basic material to neutralize the action of the thio-carboxylic acid compound, for a sufficient length of time for said thio-carboxylic compound to effect a marked decrease in the resistance of the rubber to flow over that which the rubber would have if subjected to the same conditions in absence of said thio-carboxylic acid compound.

21. Rubber obtained by subjecting unvulcanized rubber to the action of thio-benzoic acid, in the absence of more than about 3% of sulfur and in the absence of sufficient basic material to neutralize the action of the thio-benzoic acid, for a sufficient length of time for said thio-benzoic acid to effect a marked decrease in the resistance of the rubber to flow over that which the rubber would have if subjected to the same conditions in the absence of said thio-benzoic acid.

22. The method of decreasing the resistance to flow of unvulcanized rubber which comprises subjecting the unvulcanized rubber to the action of thio-anisic acid, in the absence of more than about 3% of sulfur and in the absence of sufficient basic material to neutralize the action of the thio-anisic acid, for a sufficient length of time for said thio-anisic acid to effect a marked decrease in the resistance of the rubber to flow over that which the rubber would have if subjected to the same conditions in the absence of said thio-anisic acid.

23. The method of decreasing the resistance to flow of unvulcanized rubber which comprises subjecting the unvulcanized rubber to the action of benzoyl sulfide, in the absence of more than about 3% of sulfur and in the absence of sufficient basic material to neutralize the action of the benzoyl sulfide, for a sufficient length of time for said benzoyl sulfide to effect a marked decrease in the resistance of the rubber to flow over that which the rubber would have if subjected to the same conditions in the absence of said benzoyl sulfide.

24. Rubber obtained by subjecting unvulcanized rubber to the action of thio-anisic acid, in the absence of more than about 3% of sulfur and in the absence of sufficient basic material to neutralize the action of the thio-anisic acid, for a sufficient length of time for said thio-anisic acid to effect a marked decrease in the resistance of the rubber to flow over that which the rubber would have if subjected to the same conditions in the absence of said thio-anisic acid.

25. Rubber obtained by subjecting unvulcanized rubber to the action of benzoyl sulfide, in the absence of more than about 3% of sulfur and in the absence of sufficient basic material to neutralize the action of the benzoyl sulfide, for a sufficient length of time for said benzoyl sulfide to effect a marked decrease in the resistance of the rubber to flow over that which the rubber would have if subjected to the same conditions in the absence of said benzoyl sulfide.

IRA WILLIAMS.
CARROLL CUMMINGS SMITH.